No. 794,691. PATENTED JULY 11, 1905.
G. H. STEWART.
MACHINE FOR SOLDERING SIDE SEAMS OF CANS.
APPLICATION FILED JULY 20, 1904.
3 SHEETS—SHEET 1.
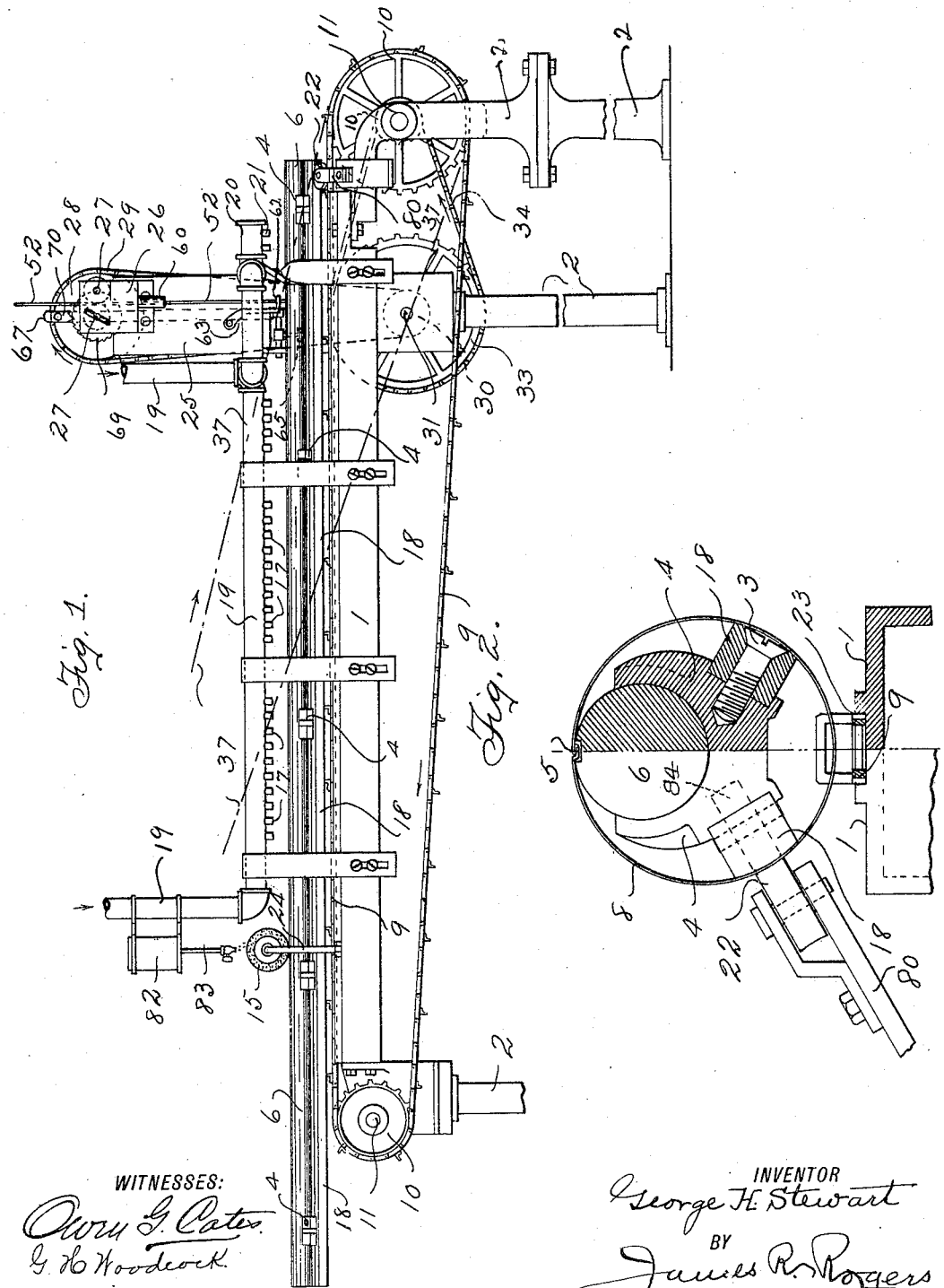
WITNESSES:
Owen G. Oates.
G. H. Woodcock.
INVENTOR
George H. Stewart
BY
James R. Rogers
ATTORNEY No. 794,691. PATENTED JULY 11, 1905.
G. H. STEWART.
MACHINE FOR SOLDERING SIDE SEAMS OF CANS.
APPLICATION FILED JULY 20, 1904.
3 SHEETS—SHEET 2.
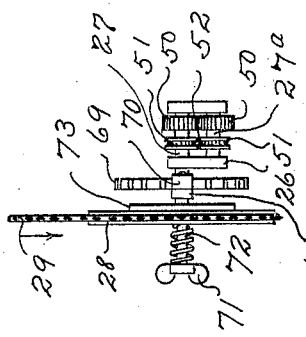
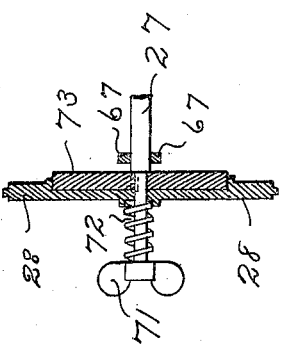
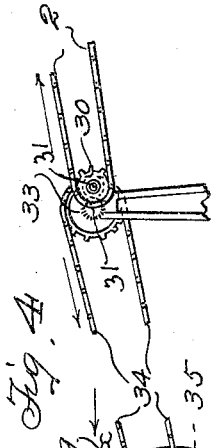
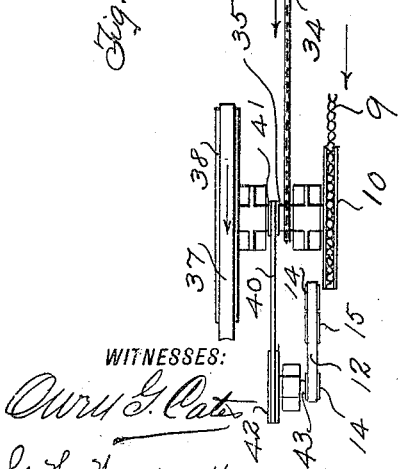
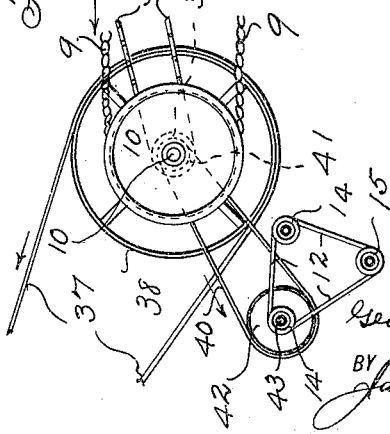
WITNESSES:
Owen G. Cate
G. H. Woodcock.
INVENTOR
George H. Stewart
BY James R. Rogers
ATTORNEY

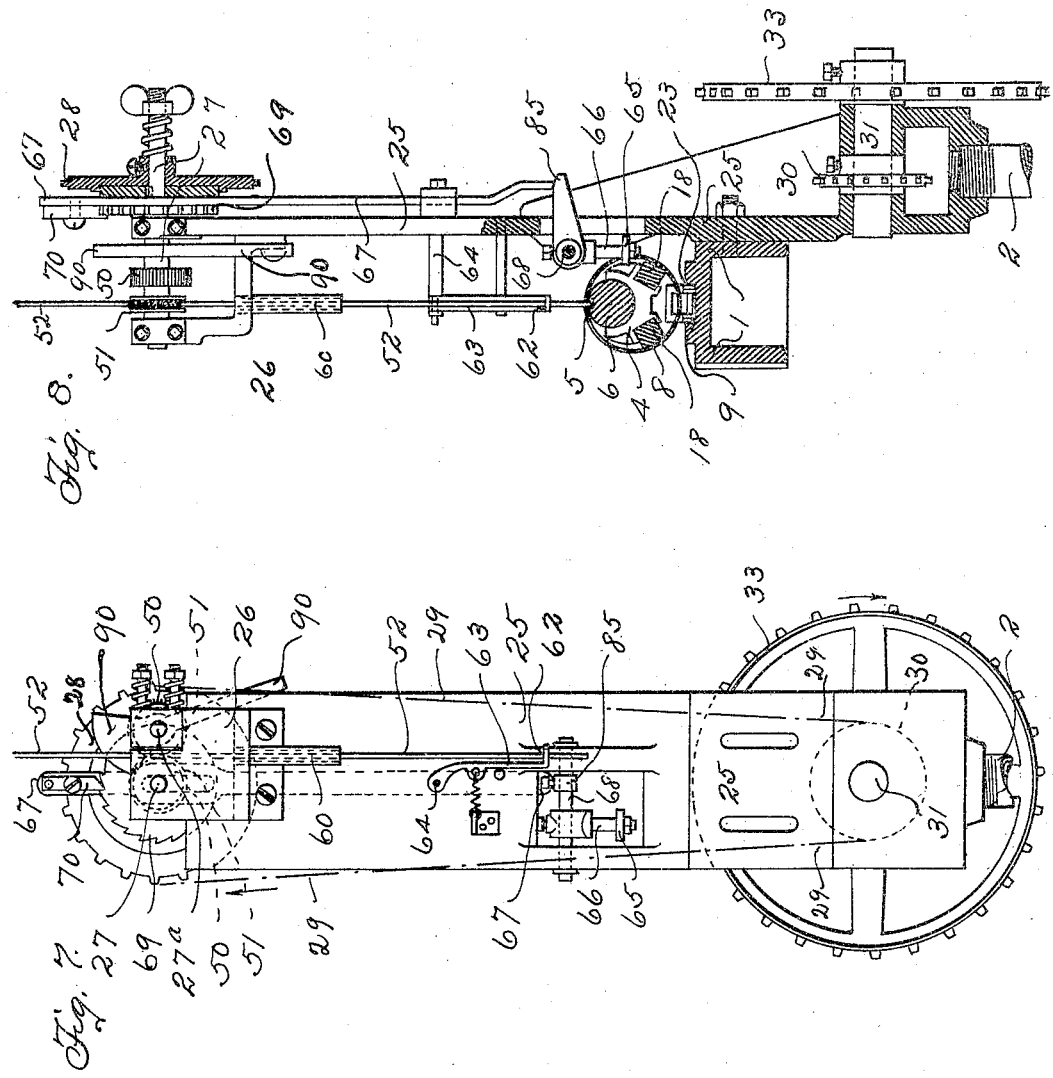

No. 794,691.

Patented July 11, 1905.

UNITED STATES PATENT OFFICE.

GEORGE H. STEWART, OF LOS ANGELES, CALIFORNIA.

MACHINE FOR SOLDERING SIDE SEAMS OF CANS.

SPECIFICATION forming part of Letters Patent No. 794,691, dated July 11, 1905.

Application filed July 20, 1904. Serial No. 217,407.

*To all whom it may concern:*

Be it known that I, GEORGE H. STEWART, a citizen of the United States, residing at Los Angeles, county of Los Angeles, State of California, have invented and discovered a new and useful Improvement in Machines for Soldering Seams of Cans; and I do hereby declare the following to be a full, clear, and exact description of the invention, such as will enable others skilled in the art to which it appertains to make and use the same.

My invention relates to can-soldering machines of that class in which the solder is applied to the previously-heated can. In machines capable of practically operating on this principle of melting the solder upon the heated can by the heat of the can the success of the operation depends upon accurate, precise, and special feeding of the solder. The cans must be moved accurately, the solder must be applied in an exact amount at the precise instant, and the application continue during the transit of the seams. It must be evenly and completely distributed on the seam, and the conditions must be such as to secure this end automatically and with certainty. Further, the cans must be evenly and properly heated before presentation to the solder. These conditions I have sought to meet and have met in my machine.

I have shown my invention applied to the soldering of side seams of cans, although part of the invention herein shown is applicable to end-seaming cans and is claimed herein for both forms of machine.

My invention is illustrated in the accompanying drawings, in which—

Figure 1 is a side elevation of my side-seam-soldering machine. Fig. 2 is a cross-section of the horn shown in Fig. 1 for holding the body-blanks. Figs. 3, 4, 5, and 6 illustrate details of construction hereinafter explained. Fig. 7 is an elevation, on a larger scale, of one side of the standard shown in Fig. 1; and Fig. 8 is a view, partly in elevation and partly in section, of Fig. 7.

Referring to Figs. 1 and 2, I describe first the mechanism for carrying the can-bodies held in proper position for side-seaming and moved so as to expose them successively first to the heating device and subsequently to the soldering device and in connection with these the devices for applying the solder accurately at the proper moment and in precise amount and for evenly and completely distributing the said solder on the seam.

The horn upon which the can-bodies are held consists of a continuous rod, two continuous bars, and spacing and connecting pieces placed at intervals upon the rod. The continuous rod is shown at 6, extending longitudinally throughout the machine from the receiving to the delivering point. Upon this rod are placed at suitable intervals spacing and connecting pieces, (shown at 4.) These are at points sufficiently near to afford a proper support for the series of can-bodies moving through the machine. Upon these pieces are fixed bars 18, (shown in cross-section in Fig. 2 and in side elevation in Fig. 1,) the exterior surfaces of which are made to conform to the interior surfaces of the can-bodies. The bars are connected to the pieces by screws 3, and the whole forms a continuous and rigid extended horn the contour of which is adapted to receive a series of can-bodies in position, as shown at 8 in Fig. 2, and to support them and guide them accurately in their movement through the machine. The seam is held in proper line by means of a groove 5 in the upper part of the rod 6, said groove being formed to exactly receive the seam and to allow it to move within the groove as a guide while the can-body is pushed along upon the horn. The receiving end of the horn on the left of Fig. 1 may have suitable connection with the mechanism for forming the body-blanks in order to receive the bodies therefrom. The delivery end of the horn on the right is supported by two diagonally-arranged brackets 80, carrying rollers 22, bearing against idle rollers 84. These are arranged in pairs on each side of the horn in the position indicated in Fig. 1 on the right-hand end, the rollers 84 being supported within the body, which is thus included between the opposite surfaces of the rollers and can be carried without injury and with minimum amount of friction. The rollers also support the weight of the horn. The can-bodies are moved upon this extended horn by means of an endless chain 9. (Shown in Figs. 1 and 2.) This chain is supported and driven upon sprocket-wheels 10, one at each end. These sprocket-wheels are mounted in suitable standards on the machine, and one is driven by any suitable driving mechanism arranged to carry the chain in its upper movement from left to right in close relation to the under side of the series of can-bodies moving on the horn, small spurs being fixed upon the links of the chain at suitable intervals to engage the edges of the body-blanks and to carry them along with the movement of the chain.

The can-bodies are carried successively upon the horn, closely following each other, first under a heating device—such, for example, as the burners 17. When these burners are used, they are connected with the fuel-supply pipe 19, arranged at a suitable distance above the line of travel of the can-body, and suitable fluxing device may be located at any proper point—for example, at the point as indicated at 15 in Fig. 1. For the sake of certainty of the even distribution of the solder I provide an additional heating device—as, for example, the burner 21'—located beyond the point in the progress of the can-bodies where the solder is applied to the can-body. This, as well as the other burners, is arranged in line with the path of the side seam.

Mechanism for feeding the solder is carried upon a standard 25, mounted on the bed-plate. In this form of the machine the solder or other material for closing the seam is in the form of a wire 52, which passes between rollers 51 51, mounted upon shafts 27 27$^a$, having their bearings in the standard and a bracket 26, fixed upon the standard, and 27 carries a sprocket-wheel 28, driven by a chain 29. The sprocket-wheel is loose upon the shaft and is pressed by a spring 72 (adjustable by a nut 71) against a wheel 73, which is fixed on the shaft 27, whereby it drives the shaft by frictional contact and through the pinions 50 drives the countershaft carrying companion feed-roller 51. The construction is such that so long as the shaft 27 is permitted freely to rotate it will be driven by the constantly-moving chain and sprocket-wheel through the frictional contact of sprocket with wheel 73 and will feed the wire; but when the shaft 27 is held fast the sprocket-wheel moves without effect on the feed and the feed of the wire ceases. In order to hold the shaft 27, and thus to control the feeding of the wire, I fix on said shaft an escapement-wheel 69. The pawl 70, which engages with and controls this escapement-wheel, and thereby gives intermittent movement to the mechanism, is fixed upon a vertically-reciprocating bar 67, sliding in suitable guides on the standard. Reciprocation to operate this pawl and control the escapement-wheel, and thereby the feed, is effected by means of a bell-crank lever having a horizontal arm 85, which projects under the lower end of the reciprocating bar 67, and its vertical arm carries the roller 65 in range with the line of moving can-bodies. This bell-crank lever is pivoted at 68 in such position that when the front end of an advancing can-body impinges against the inner or vertical arm it forces that arm outward, raises the arm 85, and lifts the bar 67, thereby releasing the escapement-wheel from the pawl and setting in motion the feed devices and feeding the wire as long as the vertical arm is held out by the can-body and the pawl thus held out of engagement. The bar 67 is lifted and held while the can-body is passing and drops when the space occurs between this can-body and the next following. It will be understood that the machine is adjusted to feed the required length of solder for each can-body, and the solder comes down in line with the seam and is taken up by the can-body as it moves. The wire is held in the proper direction by passing through a guide 60, thence downward through offset 62 in flexible guides 63, pivoted to the stud 64. The parts are so adjusted that when the pawl-carrying bar is lifted by the advancing can-body the feed mechanism is immediately released and the end of the solder-wire is brought down upon the front end of the seam. As the pawl is held out of engagement with the ratchet-wheel so long as the can-body bears against the vertical arm of the bell-crank lever, the mechanism continues to feed the wire during the passage of the can-body; but at that instant when the can-body passes the roller on the lower end of the said vertical arm the pawl-bar is permitted to drop, the ratchet-wheel is arrested, and the feed ceases to be renewed, when the next succeeding can-body repeats the operation; but while the can-body is moving against the roller the wire solder is laid upon the seam evenly and regularly by the even and regular feed. It will be borne in mind that the can-bodies as they advance are heated, so that when they come to the soldering-point they are in condition to melt the solder as it is laid upon the seam and to sweat it therein throughout the whole extent of the seam, and the whole is done automatically with certainty and rapidity by reason of the (intermittent) feed controlled by the can-body and continued throughout its passage under the solder feed. As the commencement of the feed of the solder is simultaneous with the arrival of the front end of the can-body to the soldering-point and through the controlling of the feed by the movement of the can-body itself continues throughout the passage of the can-body under that point, the feeding of the solder is entirely controlled both as to its beginning, continuation, and termination by the length of the body, and if a can-body be missing in the carrying mechanism no solder will be fed. This solder-feeding mechanism is applicable to end-seaming in a machine of the same general organization as that herein shown for side-seaming—that is to say, in a machine capable of moving the cans in series first to the presence of heating and fluxing devices and thence to the soldering devices—the cans in that case controlling in their movement the pawl-and-ratchet or other mechanism for feeding the solder at the proper time, as shown in my application filed in the United States Patent Office November 28, 1904, Serial No. 234,570, as a divisional part of this application, and I claim in this application the general organization, including the feeding devices, whether controlled by the can-bodies, as in side-seaming, or by the cans, as in end-seaming.

I claim—

1. In a can-soldering machine the combination of means for moving a can-body continously past the solder-point, means for heating the cans or bodies prior to reaching the solder-point, and mechanism for feeding solder to the can in the form of wire, said mechanism being controlled by the can-body in its continuous passage by the solder-point to feed definite and exact lengths of said solder-wire, substantially as described.

2. In combination in a can-soldering machine, means for moving the cans axially wire-solder-feeding means to direct the wire solder to the side seam and means acted on by the can and traversing the same from end to end for controlling the feeding of the solder-wire, substantially as described.

3. In combination, a horn, a chain for moving the can-bodies along the horn, wire-solder-feeding devices for directing the solder-wire to the seam, means in the path of the can-body and arranged to traverse the same from end to end, said means controlling the feed of the solder-wire, substantially as described.

4. In combination means for moving the can-body in a substantially horizontal position with its side seam uppermost, means for feeding solder-wire down upon the said side seam, whereby the end of the solder-wire will traverse the can-body from end to end, and means engaging the side of the can and traversing the same from end to end, parallel with the side seam, said means controlling the feed of solder-wire to the side seam and engaging and disengaging the can-body simultaneously with the solder-wire, substantially as described.

5. In combination, a horn over which the can-body moves, solder-wire-feed means for directing wire solder to the seam, and controlling means contacting with another part of the can and which traverses the same from end to end parallel with the path of the solder.

6. In combination, a horn over which the can-body moves, means above the can-body for feeding the solder-wire down upon the same and means engaging the side of the can-body and traversing said body from end to end, said means controlling the feed of the solder, substantially as described.

7. In combination, a horn over which the can-body moves, means above the can-body for feeding the solder-wire down upon the same and means engaging the side of the can-body to one side of the seam and traversing said body from end to end, said means controlling the feed of the solder, and including a bell-crank lever, substantially as described.

8. In combination in a can-soldering machine, means for moving the cans axially or in the direction of their length soldering means to direct the wire solder to the side seam, and means acted on by the can and traversing the same from end to end for controlling the feeding of the solder-wire, the said cans being moved continuously past the soldering-point, substantially as described.

9. In a can-soldering machine, and in combination, a solder-feeding device operated by a constantly-moving power, through frictional contact, and an arresting device controlled by the movement of the cans and acting intermittently on the feed device, substantially as described.

10. In combination in a can-soldering machine, means for moving a can-body past the solder-point, means for heating the can or body prior to reaching the solder-point, and mechanism for feeding the solder to the can in the form of wire, said mechanism being controlled in its feeding movement by the can-body to an extent corresponding to the length of the said can-body, substantially as described.

In testimony whereof I have signed my name to this specification in the presence of the two subscribing witnesses.

GEORGE H. STEWART.

Witnesses:
  ANNA MORGAN,
  G. H. WOODCOCK.